Patented Aug. 27, 1929.

1,726,364

UNITED STATES PATENT OFFICE.

MARK BERNARD PATTESON, OF CORONA, CALIFORNIA, ASSIGNOR TO CALIFORNIA FRUIT GROWERS EXCHANGE, A CORPORATION OF CALIFORNIA.

AGENT FOR THE CONTROL OF PESTS INJURIOUS TO VEGETATION.

No Drawing.   Application filed March 17, 1926.   Serial No. 95,431.

My said invention relates to agents for the control of pests injurious to vegetation, and it is an object of the invention to provide a liquid preparation of the character indicated which shall be capable of distribution in a very thin film on fruit trees and other vegetation.

Another object is to provide an emulsion of a suitable character for destroying living insects, their eggs, or both eggs and insects, with a minimum admixture of solid materials and consequently with a minimum residue of solids on the plants after treatment.

Another object is to render it possible to make a very even distribution in spraying, thus avoiding the formation of large droplets with consequent injury to the plant tissues by reason of undue concentration of the active ingredients such as mineral oils and the like. This also makes it practicable to use higher concentrations of oil in the prepared spray than has heretofore been customary, without damage to the tender vegetation to which the spray is applied.

It is a matter of common knowledge that many of the insect pests which infest fruit trees and other plants may be destroyed by application of liquids in the form of sprays which contain materials that kill the insects or destroy their eggs or both. Among the active materials used in such sprays are certain mineral oils and other ingredients which normally are not soluble in water and which must yet be distributed in a very thin film over the foliage, twigs and other parts of the plants being treated in order to be effective and in order not to damage the same.

Thorough and uniform distribution is materially helped by emulsifying the oil or other active agent so that it is uniformly distributed in the water which is used as a vehicle for applying such active agent to the plants being treated, and by means of which proper concentration is secured. Heretofore such materials as alkalies, alkali carbonates, proteins such as glue, casein and the like have been used to facilitate and render more stable the products of the emulsifying processes used, but these materials have been more or less unsatisfactory for various reasons.

According to the invention which is the subject of this application I substitute for the various substances heretofore proposed, one of the class of substances known as pectin or a mixture of such substances. Pectin is a non-protein compound of organic derivation and falls within the class of complex plant substances known under the term hemicelluloses. This compound or any of the substances known as pectin or any mixture of them may be used in carrying out my invention, if it (or the mixture) is soluble in water with or without the aid of small amounts of acid or alkali.

The following is a description of a representative method of preparing my improved spraying material but it will be understood that substantial departures may be made from the details stated without in fact departing from the spirit and scope of the invention.

I dissolve one ounce of dry powdered pectin or an equivalent amount of pectin solution in one gallon of water as by sifting the powdered pectin slowly in the water while the same is being thoroughly agitated. If the pectin is already in solution the necessary amount of the solution may be stirred directly into the water. One gallon of mineral oil or mineral oil distillate or other oil of suitable quality is then added to the solution with constant and thorough agitation. Under these conditions the oil is thoroughly emulsified with the water solution of pectin and the emulsion so obtained is miscible with water in all proportions. The mixture of pectin, oil, and water is then diluted with further quantities of water to produce any desirable concentration of oil in the final mixture.

The process thus described produces an emulsion which is very stable. Under ordinary conditions of use there is none of the usual difficulty of separation of the oil into a distinct layer.

I am aware that other substances have been used in an effort to produce similar results. For instance, in Bulletin No. 1217 of the U. S. Dept. of Agriculture, mention is made of casein, gelatin, skim milk powder, glue, starch, flour, etc. and in the Journal of Agricultural Research, Vol. 31, pages 59 to 65, colloidal clays are mentioned as being useful for such work. It is to be noted that the most effective agent named is casein of which eight ounces is required to produce three gallons of emulsion which contains two gallons of oil, while my method produces at least sixteen gallons of an emulsion containing at least eight gallons of oil with the use of only eight ounces of pectin, and the proportion of oil can be largely increased if desired.

It is to be understood that the term pectin as used in the specification and claims is intended to refer to any one of the pectic substances or any mixture of them which is soluble in water with or without the aid of small amounts of acid or alkali, and is intended to refer to such substances in either a wet or a dry state.

It will be obvious to those skilled in the art that the process described in the specification may be varied in numerous respects, with consequent variations in the product, all without departing from the spirit of the invention, and therefore I do not limit myself to the precise process or product so described but only as indicated in the appended claims.

Having thus fully described my said invention, what I claim and desire to secure by Letters Patent is:

1. An agent for the control of pests injurious to vegetation comprising in emulsified form an oil, a dispersion medium therefor and an emulsifying agent, the latter comprising a pectin containing composition.

2. A composition for application to vegetation for the control of pests injurious thereto comprising a mineral oil, an aqueous dispersion medium therefor, and a comparatively small percentage of pectin dissolved in the dispersion medium as an emulsifying agent.

3. A composition for the control of pests injurious to vegetation including as essential ingredients thereof an emulsifying agent comprising pectin, a dispersion medium and a mineral oil composition dispersed evenly in the medium.

4. In an improved composition for the control of pests injurious to vegetation, a mixture including a mineral oil and water in suitable proportions to provide the desired control when applied as an emulsion to vegetation, and pectin.

5. In an improved composition for the control of pests injurious to vegetation, a mixture including a mineral oil and water in suitable proportions to provide the desired control when applied as an emulsion to vegetation, and pectin in quantities sufficient to distribute said oil uniformly in the water.

6. An agent for the control of pests injurious to vegetation comprising an emulsion of oil, water and pectin and containing a material actively poisonous to a pest to be combated.

In testimony whereof I affix my signature.

MARK BERNARD PATTESON.